(12) United States Patent
Gao et al.

(10) Patent No.: US 6,358,317 B1
(45) Date of Patent: Mar. 19, 2002

(54) RADIAL CONTACT APPLICATOR ROLL

(75) Inventors: Guang Gao, Newark; Andrew Lawrence Snedden, Granville; David Lynn Molnar, Newark; Tom Orin Matteson, Pickerington; Richard Alan Green, Pataskala, all of OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/474,505

(22) Filed: Dec. 29, 1999

(51) Int. Cl.[7] ................................................. B05C 1/00
(52) U.S. Cl. ............................. 118/234; 118/DIG. 15; 118/DIG. 20
(58) Field of Search ........................ 118/234, DIG. 15, 118/DIG. 20, 307, 208, 244, 258, 259, 260; 184/17; 101/172; 492/17, 26, 16; 28/246, 261, 265, 286; 57/7, 32, 286, 292, 295; 65/529, 443, 444

(56) References Cited

U.S. PATENT DOCUMENTS

| | | |
|---|---|---|
| 3,500,524 A | 3/1970 | Jagminas |
| 3,676,908 A | 7/1972 | Wittler et al. |
| 3,757,399 A | 9/1973 | Hanssen |
| 3,876,404 A | 4/1975 | Drummond |
| 3,940,043 A | 2/1976 | Staples |
| 4,517,916 A | 5/1985 | Barch et al. |
| 4,805,274 A | 2/1989 | Gallant et al. |
| 5,961,685 A | 10/1999 | Streets et al. |

FOREIGN PATENT DOCUMENTS

EP 0 638 683 2/1995

*Primary Examiner*—Brenda A. Lamb
(74) *Attorney, Agent, or Firm*—Inger H. Eckert

(57) ABSTRACT

A roll for applying a sizing composition to a fan of one or more fibers, providing a shaft having a curved central axis and a sleeve covering at least a portion of the shaft, the sleeve being rotatable relative to the shaft. Each fiber of the fan of one or more fibers contacts the sleeve at an axial location of the sleeve such that each fiber of the fan of one or more fibers lies substantially in a plane perpendicular to the curved central axis of the shaft at the axial location.

10 Claims, 4 Drawing Sheets

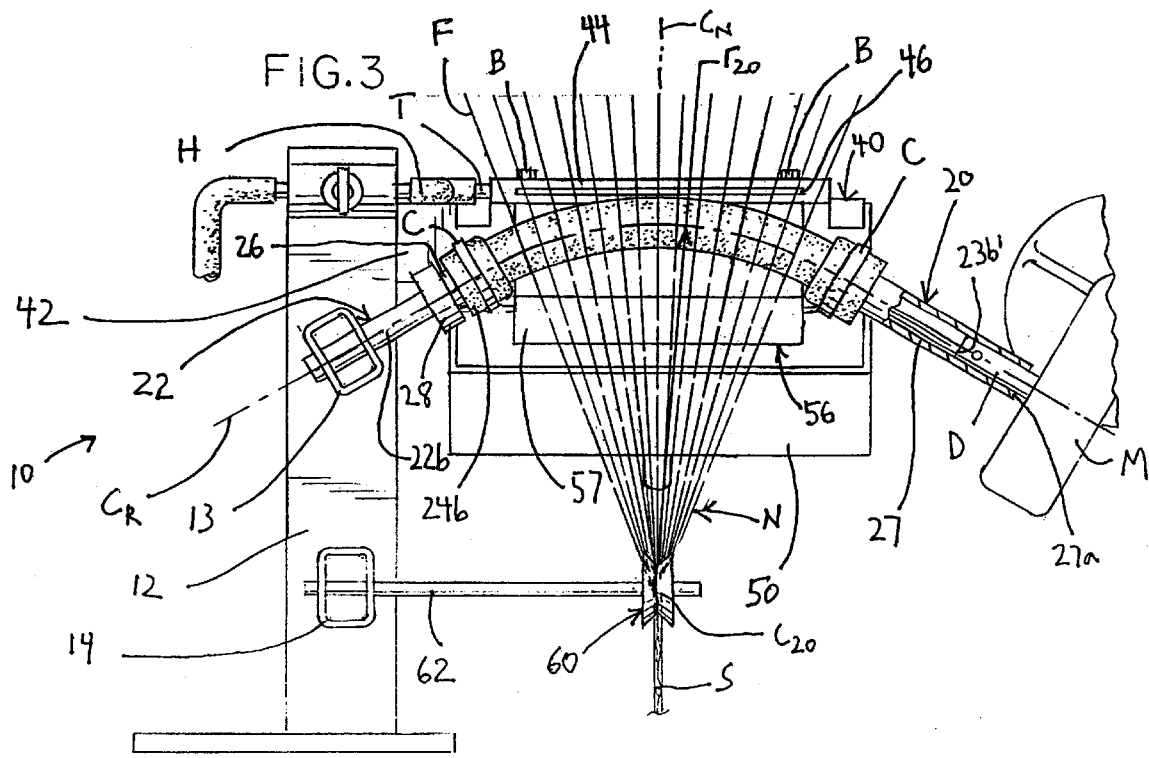
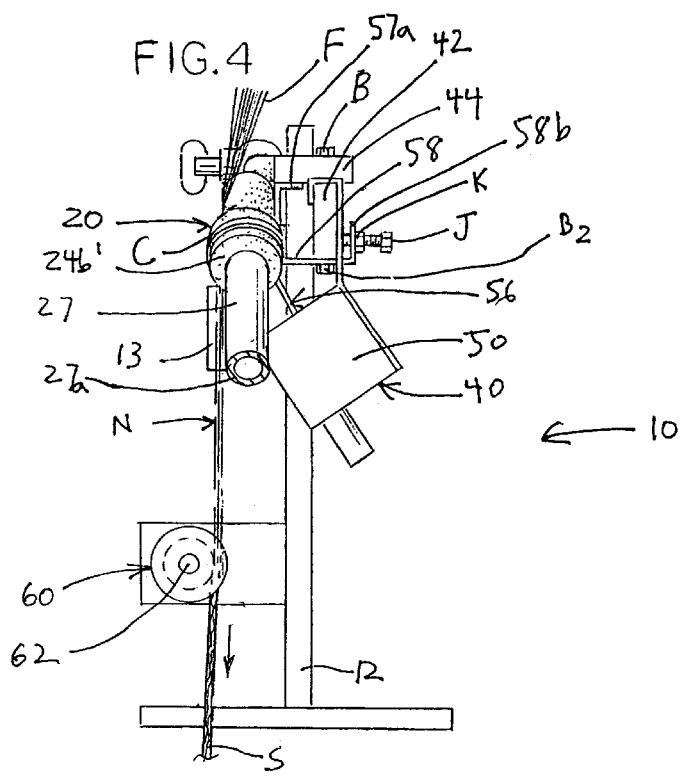

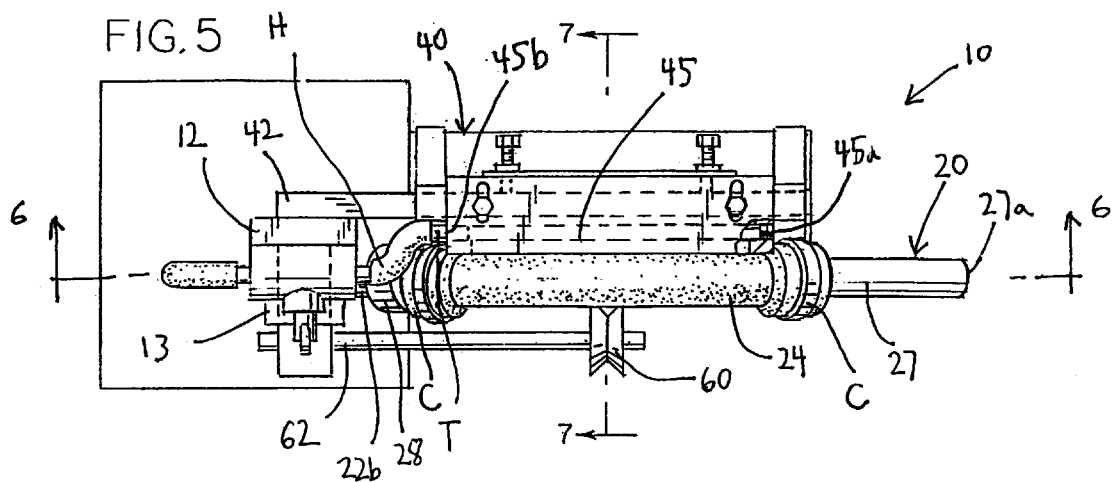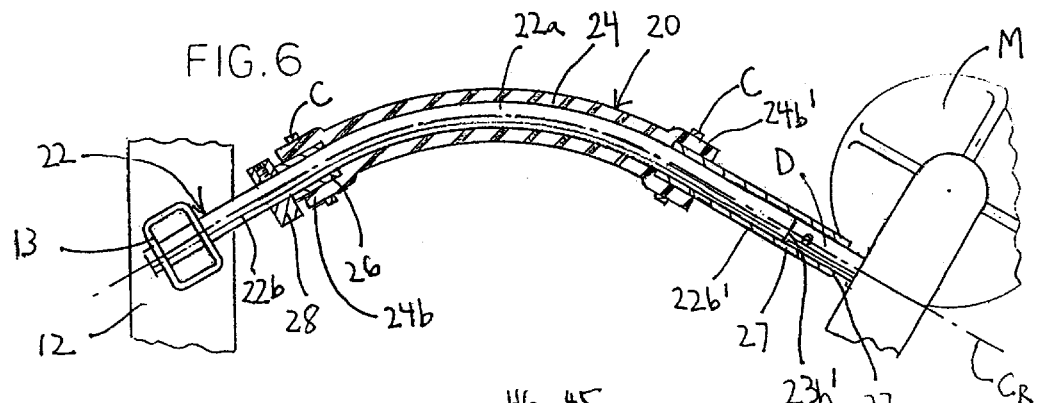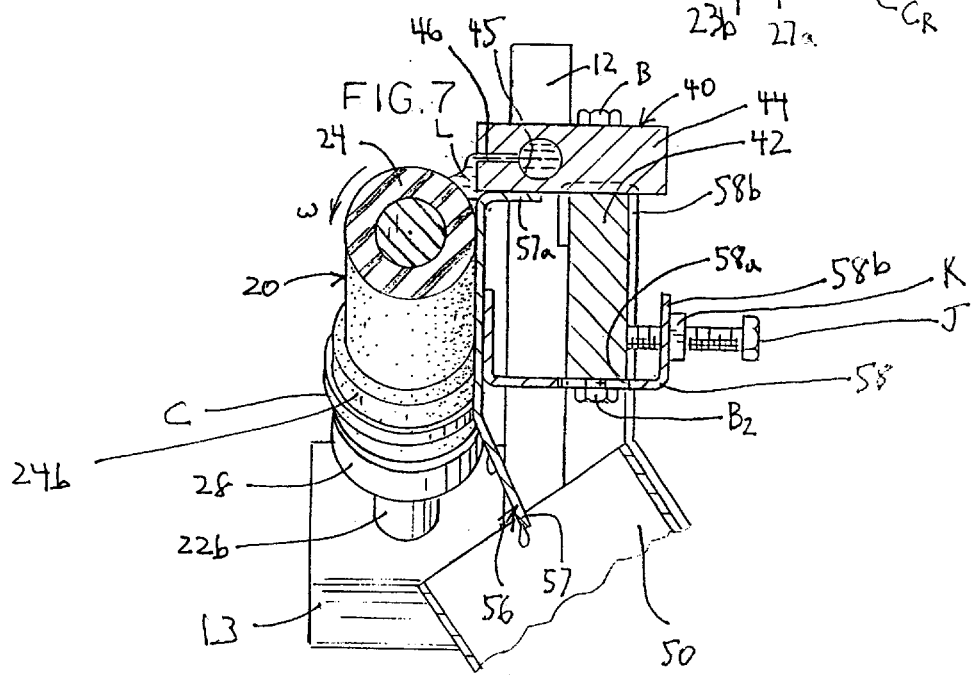

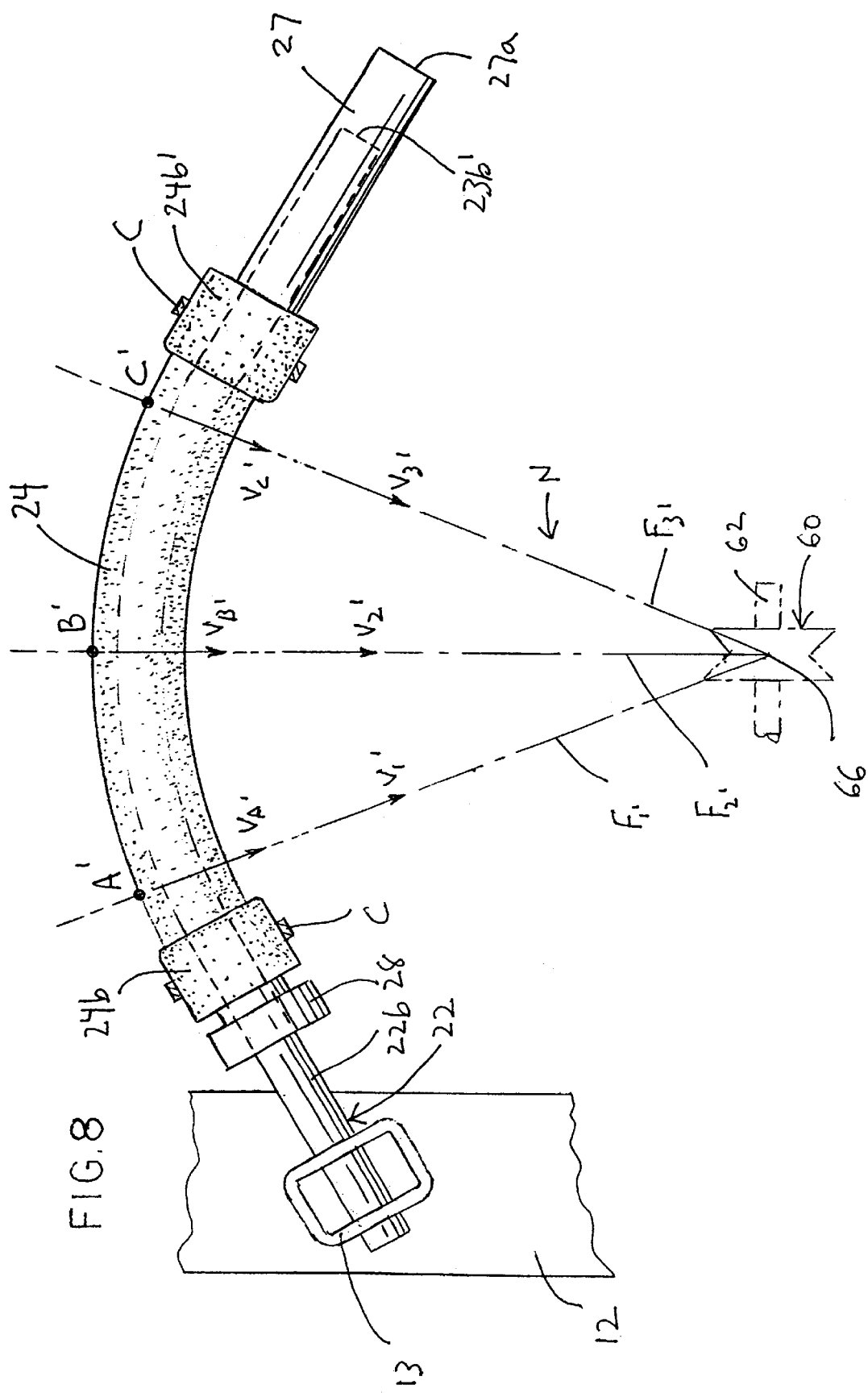

RADIAL CONTACT APPLICATOR ROLL

TECHNICAL FIELD AND INDUSTRIAL APPLICABILITY OF THE INVENTION

The present invention relates to an applicator roll for applying a liquid composition to the individual fibers of a fan of fibers contacting the roll. More particularly, the present invention relates to an applicator roll for applying a liquid composition to the individual fibers of a fan of fibers contacting the roll, wherein the negative effects of fiber-to-roll contact are minimized.

BACKGROUND OF THE INVENTION

One or more fiberglass strands used, for example, in manufacturing fiberglass-reinforced products, typically are formed by gathering the individual fibers of a fan of glass fibers exiting a glass fiber-forming bushing and by combining the individual glass fibers into one or more strands. A sizing composition is applied, such as, by an applicator roll, to the individual fibers, wherein the sizing composition serves to reduce fiber stress caused by, for example, fiber-to-fiber friction associated with direct fiber-to-fiber contact. The applicator roll typically is cylindrical, is constructed from graphite and is driven to rotate at a modest rotational velocity, as compared to the tangential linear velocity of the fibers as they pass over (and typically contact) the roll.

A sizing composition is applied to the roll, such as, for example, by submerging a portion of the roll into a shallow pool of sizing composition contained within a pan. The roll is then rotated such that the sizing composition is transferred to a position of the roll, whereat the fan of fibers momentarily contact, or Akiss@, the roll and pick up a small quantity of the sizing composition. The amount of sizing applied to the fibers by the applicator roll is controlled, for example, by controlling the rotational velocity of the roll relative to the tangential linear velocity of the fibers as they kiss the roll. U.S. Pat. No. 4,517,916 to Barch, et al. is illustrative of prior art attempts to provide a cylindrical applicator roll for applying a chemical treatment to textile fibers.

With reference to FIG. 1, the roll R typically is mounted such that the linear axis $C_R$ thereof is horizontal, and as such, a point A on the periphery of the roll R travels at a velocity $v_A$ residing exclusively within a vertical plane $P_A$ perpendicular to the axis $C_R$ of the roll R. That is, as roll R rotates about axis $C_R$, peripheral points of the roll, being each a fixed distance from the axis $C_R$ of the roll R, travels at the same linear tangential velocity. For example, point A, located on the periphery of roll R within plane $P_A$, travels at velocity $v_A$, which is the same as velocity $v_C$ of point C, which also is located on the periphery of the roll R, but within plane $P_C$, which is parallel to, but spaced from, plane $P_A$. Moreover, all peripheral point velocities, for example, velocities $v_A$, $v_B$, $v_C$, of points A, B, C, respectively, are of equal magnitude.

Fibers $F_1$, $F_2$, $F_3$, which together form a fiber fan N generally converging from a wide upper end thereof near the glass-forming bushing (not shown) to a narrow lower end thereof near a radial gathering Ashoe@ roll (not shown in FIGS. 1 and 2), each contact the periphery of applicator roll R, for example, at points A, B, C, respectively, and travel at velocities $v_1$, $v_2$, $v_3$, respectively, towards the gathering shoe. Velocities $v_A$, $v_B$, $v_C$ are much smaller than velocities $v_1$, $v_2$, $v_3$, respectively.

With additional reference to FIG. 2, and in referring only to point A, fiber velocity $v_1$ lies in a plane which is oblique to roll point velocity $v_A$ in a direction towards a centerline axis $C_N$ of fan N by an $angle_1$. Due to point velocity $v_A$ acting on fiber velocity $v_1$, a resultant velocity $R_{1A}$ acts on fiber $F_1$, oblique to fiber velocity $v_1$, in a direction away from fan centerline axis $C_N$ by $angle_1$, thereby urging the fiber $F_1$ in a direction away from fan centerline $C_N$, and resulting in so-called Afiber walking@ of the fiber $F_1$ towards one end $R_1$, $R_2$ of the roll R. of course, fiber $F_1$, which is located between a first end $R_1$ of roll R and fan centerline $C_N$, will walk towards the first end $R_1$ of roll R, whereas fiber $F_3$, which is located between a second end $R_2$ of roll R and fan centerline $C_N$, will walk towards the second end $R_2$ of roll R. Fiber walking increases fiber-to-fiber abrasion, imparts additional tensile and shear stresses within the fibers, and produces uneven coating of the sizing composition onto the fibers. Thus, it is desirable to provide a roll for applying a liquid composition to the individual fibers of a fan of fibers passing over the roll, wherein fiber walking is minimized.

Moreover, assuming that point B lies in a plane containing fan centerline $C_N$, fiber velocity $v_2$ is coaxial with point velocity $v_B$, and a resultant velocity (not shown) between fiber velocity $v_2$ and point velocity $v_B$ lies in the plane containing point centerline $v_B$, fiber velocity $v_2$, and fan centerline $C_N$. Fiber $F_2$, unlike fibers $F_1$ and $F_3$, then, is not urged away from fan centerline $C_N$ and does not walk towards either end $R_1$, $R_2$ of roll R. Rather, less tensile stress is induced in fiber $F_2$ than is induced in fibers $F_1$, or $F_3$ Accordingly, fibers $F_1$, $F_2$, $F_3$ of fan N experience varying degrees of tensile stress and walking, depending on the distance of the fibers $F_1$, $F_2$, $F_3$ from the fan centerline $C_N$. That is, the farther a fiber is from fan centerline, the greater the degree of tensile stress induced therein, and the greater the degree of walking experienced thereby. It is therefore desirable to provide a roll for applying a liquid composition to the individual fibers of a fan of fibers passing over the roll, wherein the negative effects of fiber-to-roll contact are minimized.

Curved rolls are known in the art for specific applications. For example, U.S. Pat. No. 3,500,524 to Jaminas and U.S. Pat. No. 4,805,274 to Gallant, et al. each teaches a roll having an adjustable radial deflection or curvature. However, neither Jaminas >524 nor Gallant >274 teaches an applicator roll for applying a liquid composition to the individual fibers of a fan of fibers passing over the roll, wherein the negative effects of fiber-to-roll contact are minimized.

SUMMARY OF THE INVENTION

The present invention is for an applicator roll used to apply a sizing composition to the individual fibers of a fan of fibers being gathered, for example, into a strand for use in fiberglass-reinforced products. The applicator roll is generally of an arcuate shape and includes a curved shaft and an elastic sleeve covering at least a portion of the shaft. The shaft includes a central axis having a curved center portion defining a radius and linear end portions extending from either end of the curved center portion. The sleeve, which is elastic and resembles a piece of rubber hose, fits over all of shaft curved center portion and over at least a portion of shaft linear end portions, then, includes a center axis which is coincident with the shaft center axis. The applicator roll is part of a sizing delivery system and is positioned adjacent to a sizing delivery assembly and upstream from a gathering shoe.

The sleeve is connected at one end thereof to a drive, which rotates the sleeve around the shaft. The sleeve is positioned relative to a sizing delivery assembly such that an outer surface of the sleeve receives liquid sizing dispensed through a slotted orifice provided in the sizing delivery assembly. Rotation of the sleeve, then, carries the liquid sizing to a location where the individual fibers of the fan of fibers kiss the outer surface of the sleeve and pick up a small quantity of the sizing composition thereby. Excess sizing is collected in a reservoir positioned beneath the roll and is re-circulated back into the sizing delivery assembly.

Because the roll is arcuate, fibers kissing the outer surface of the sleeve are each traveling in a direction which is substantially coaxial with the direction of travel of the sleeve at the point at which the fiber kisses the sleeve. Accordingly, fiber walking is substantially reduced or eliminated. Moreover, fibers are subjected to a substantially constant tensile stress, regardless of the position of the fiber relative to the fan centerline.

According to one aspect of the present invention, a roll for applying a sizing composition to a fan of one or more fibers is provided, comprising a shaft having a curved central axis, and a sleeve covering at least a portion of the shaft, the sleeve being rotatable relative to the shaft, wherein each fiber of the fan of one or more fibers contacts the sleeve at an axial location along the sleeve, and wherein each fiber of the fan of one or more fibers lies substantially in a plane perpendicular to the curved central axis of the shaft at the axial location.

According to another aspect of the present invention, a method of applying a sizing composition to a fan of one or more fibers is provided, comprising the steps of providing an element having a curved central axis, rotating the element about the curved central axis, applying a coating of sizing composition to the element as the element rotates about the curved central axis, and conveying each fiber of the fan of one or more fibers over the element, whereby each fiber of the fan of one or more fibers contacts the element at an axial location along the element and moves over the element in a direction which lies substantially in a plane perpendicular to the central axis of the element at the axial location of the element, and whereby the sizing composition is transferred from the element to each fiber of the fan of one or more fibers.

According to yet another aspect of the present invention, a system for applying a sizing composition to a fan of one or more fibers is provided, comprising an element having a curved central axis, wherein each fiber of the fan of one or more fibers contacts the element at an axial location along the element and moves over the element in a direction which lies substantially in a plane perpendicular to the central axis of the element at the axial location of the element, and a sizing delivery assembly for providing sizing composition to a surface of the roll, the sizing composition being transferred to each of the fibers of the fan of one or more fibers when the fibers contact the element.

It is an object of the present invention to provide a roll for applying a liquid composition to the individual fibers of a fan of fibers passing over the roll, wherein fiber walking is minimized.

It is another object of the present invention to provide a roll for applying a liquid composition to the individual fibers of a fan of fibers passing over the roll, wherein the negative effects of fiber-to-roll contact are minimized.

These and additional objects, features and advantages of the present invention will become apparent to those reasonably skilled in the art from the description which follows, and may be realized by means of the instrumentalities and combinations particularly pointed out in the claims appended hereto.

BRIEF DESCRIPTION OF THE DRAWINGS

A better understanding of the present invention will be had upon reference to the following description in conjunction with the accompanying drawings in which like reference numerals represent like parts, and wherein:

FIG. 3 is a front elevation view of a system for applying a sizing composition to a fan of one or more fibers according to a preferred embodiment of the present invention;

FIG. 4 is a side elevation view of the system of FIG. 3;

FIG. 5 is a top plan view of the system of FIG. 3, wherein the fan of one or more fibers is not shown;

FIG. 6 is a partial front section view of an applicator roll of the system of FIG. 3, taken along section line 6—6 of FIG. 5;

FIG. 7 is a side section view of the system of FIG. 3, taken along section line 7—7 of FIG. 5; and, FIG. 8 is a schematic representation of the applicator roll of FIG. 5, showing several fibers of a fan of fibers contacting the roll.

DETAILED DESCRIPTION AND PREFERRED EMBODIMENTS OF THE INVENTION

Figure 1:
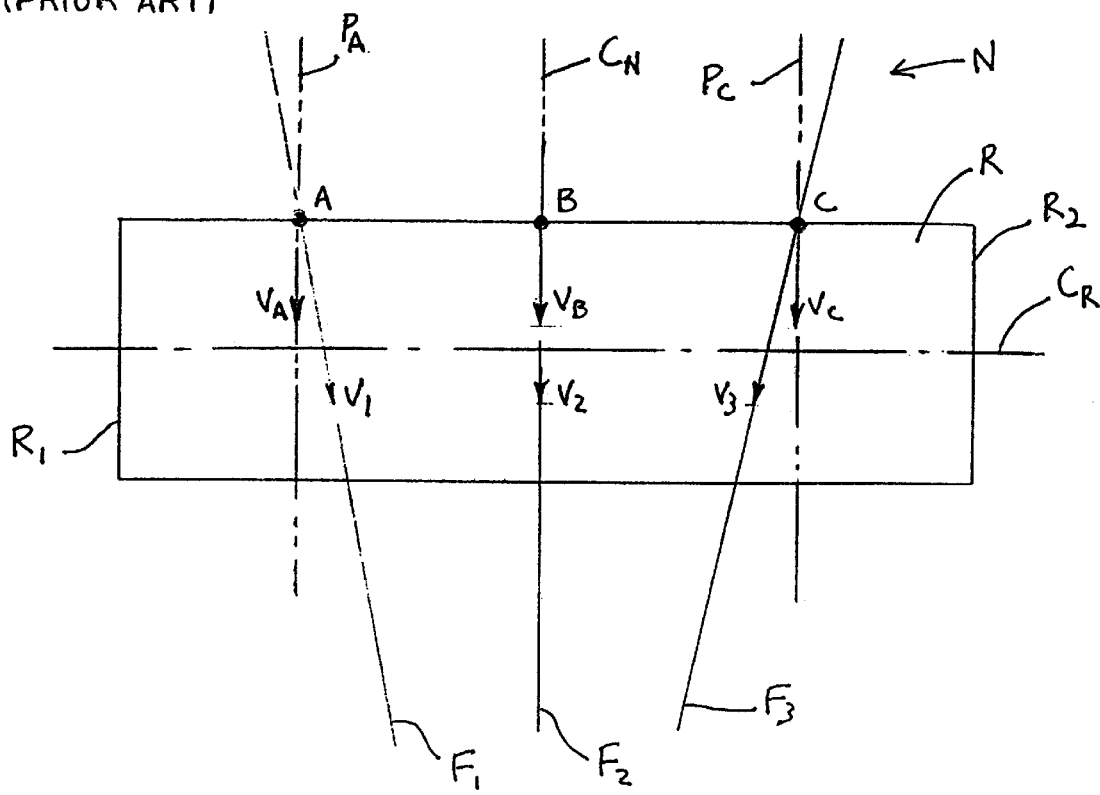
FIG. 1 is a schematic representation of an applicator roll of the prior art, showing several fibers of a fan of fibers contacting the roll.
Figure 2:
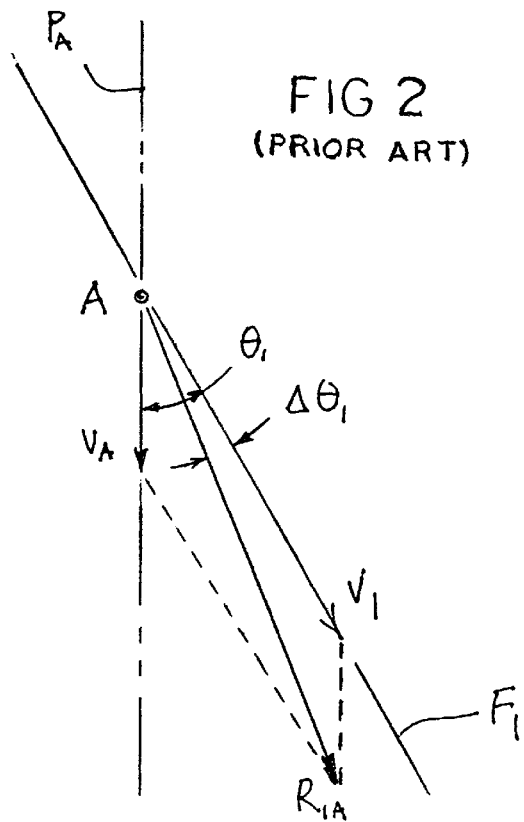
FIG. 2 is a kinematic diagram of one point located on the periphery of the roll of FIG. 1.

With combined reference to FIGS. 3–5, a system 10 for applying a liquid sizing composition L (FIG. 7) to one or more fibers F forming a fiber fan N includes an applicator roll 20 and a sizing delivery assembly 40. As illustrated in FIGS. 3 and 4, a gathering shoe 60 is provided below the system 10. Upright frame 12 supports and positions roll 20, assembly 40 and shoe 60 relative to one another, and is fixedly mounted, for example, to the floor beneath a glass fiber-forming bushing (not shown) coupled to a glass-melting furnace. System 10 receives individual fibers F forming fan N and applies a small quantity of sizing composition L (FIG. 7) to each fiber F of the fan N before shoe 60 gathers the fan of fibers F into a strand S for subsequent handling, for example, to be used as reinforcing material in fiberglass-reinforced products. Fiber fan N is substantially centered on roll 20 such that fiber fan N includes a centerline axis $C_N$ which vertically aligns a center portion, or crest, of roll 20 with shoe 60. Fan N, roll 20, assembly 40, and shoe 60 then, are generally symmetric about fan centerline $C_N$.

With additional reference to FIG. 6, roll 20 includes a generally arcuate shape defining a radius $r_{20}$ having a center $c_{20}$, or focal point, located substantially near shoe 60. Roll 20 includes a curved shaft 22 having an arcuate center portion 22a terminating in linear end portions 22b, 22b= and defining a roll center axis $C_R$ having a curved center portion corresponding to curved center portion 22a of shaft 22 and linear end portions corresponding to linear end portions 22b, 22b= of shaft 22. A first end portion 22b of shaft 22 is fixedly connected to upright frame 12, such as, by bracket 13. Shaft 22 preferably is constructed from a light-weight, corrosive-resistant material, such as aluminum or tubular stainless steel.

A sleeve 24 (also referred to herein as an element) covers arcuate center portion 22a of shaft 22 and extends over at least a portion of each of the shaft end portions 22b, 22b=. Sleeve 24 is constructed from a flexible, fatigue-resistant, natural or synthetic elastomer having a sufficient hardness, for example, a hardness of between 80A and 90A, measured on the so-called AShore Scleroscope@ hardness scale, to permit sliding rotation of sleeve 24 over shaft 22 about roll center axis $C_R$. For example, suitable materials preferably include neoprene, natural rubber, silicone rubber, a synthetic rubber elastomer sold under the trademark HYPALON by E.I. DuPont De Nemours and Company of Wilmington, Del., a synthetic rubber composition sold under the trademark VITON by E.I. DuPont De Nemours and Company of Wilmington, Del., and a thermoplastic elastomer sold under the trademark SANTOPRENE by Monsanto Company of Akron, Ohio.

A first sleeve bushing 26 is interposed between shaft 22 and sleeve 24 at a first end 24b of sleeve 24 covering at least a portion of shaft first end portion 22b and is clamped to the first end 24b of the sleeve 24 by a conventional hose clamp C with sufficient force to prevent relative rotation therebetween. As such, first bushing 26 rotates with sleeve 24 around shaft 22. Bushing 26 is constructed from a suitable bushing material, such as, brass or a self-lubricating metallic material, having high wear-resistance and providing a low frictional mating surface with shaft 22.

A first collar stop 28 is fixedly secured, such as, by a set screw (not shown), on end portion 22b of shaft and is positioned thereon to abut a free end of first bushing 26, which extends from within sleeve end 24b by a short distance. Collar 28, then, prevents bushing 26 (and sleeve 24, which, as stated above, is clamped to bushing 26 by clamp C) from moving over an outer surface of shaft 22 towards bracket 13.

A second sleeve bushing 27 is interposed between shaft 22 and sleeve 24 at a second end 24b= of sleeve 24 covering at least a portion of shaft second end portion 22b= and is clamped to the second end 24b= of the sleeve 24 by a conventional hose clamp C with sufficient force to prevent relative rotation therebetween. As such, second bushing 27 rotates with sleeve 24 around shaft 22. Bushing 27, like bushing 26, is constructed from a suitable bushing material, such as, brass, having high wear-resistance and providing a low frictional mating surface with shaft 22.

Second bushing 27 extends from within sleeve end 24b= and beyond an end 23b= of shaft 22, defining an open end 27a thereof, which is sized to receive a drive shaft D therein. Drive shaft D is connected to a drive device M, such as a motor or a gearbox connected to a motor. Free end 27a of bushing 27 is connected to drive shaft D to prevent relative rotational movement therebetween and to provide positive torque transmission thereover. For example, bushing 27 may be pinned or keyed to shaft D. As such, rotation of drive shaft D, such as, by drive device M, causes rotation of second bushing 27, which, in turn, causes rotation of sleeve 24 and of first bushing 26, all such rotational movement being around shaft 22, which remains stationary due to bracket 13. Because sleeve 24 is held in position over shaft 22 between drive shaft D and collar 28, collar 28 may be positioned on shaft 22 to provide a small compression force in sleeve 24, which increases overall stability of the sleeve 24.

With combined reference now to FIGS. 3 and 4, the shoe 60 is rotatably mounted, such as, for example, by a ball bearing (not shown), to one end of a rod 62, which is fixedly mounted at another end thereof to upright frame 12, such as, by bracket 14. As stated above, shoe 60 lies along fan centerline axis $C_N$ and is sized to receive and gather the fibers F into a strand S, and to pass the strand S onto a fiber strand-handling machine (not shown), such as a winder.

With reference to FIGS. 4, 5 and 7, the sizing delivery assembly 40 includes a cross-member 42 fixedly connected to upright frame 12 and substantially spanning the roll 20, a sizing delivery manifold 44 attached to cross-member 42, for example, by bolts B, a sizing reservoir 50 suspended from cross-member 42 vertically beneath manifold 44, and a deflector 56 adjustably affixed to cross-member 42, for example, by adjuster bolts J.

Manifold 44 includes a housing defining a chamber 45 closed at one end 45a thereof and open at another end 45b thereof. The open end 45b is provided with a suitable fitting T to which a hose H, supported by, and passing through, upright frame 12, may be connected supplying liquid sizing composition L thereto under pressure. Liquid sizing L is dispensed from chamber 45 through a longitudinal dispensing slot 46 provided through housing and opening over roll 20. Sizing L supplied to the chamber 45 under pressure, then, is dispensed through slot 46 and permitted to flow onto roll 20, and particularly, onto sleeve 24 of roll 20.

Deflector 56 includes a shield 57 fixedly connected to a support 58, which is slidably connected to cross-member 42 by bolts $B_2$ through slots 58a in support 58. Shield 57, then, is movable towards, and away from, roll 20 by sliding support 58 on bolts $B_2$. Adjustment screws J are threadingly affixed to an upturned portion 58b of support 58, such as, by threaded nuts K. Turning adjustment screws J, then, translates support 58 along the axis of bolts J, such as, by threaded nuts K, thereby moving shield 57 towards, or away from, roll 20, depending on the direction of rotation of bolts J. Shield 57 includes a lower end extending into the sizing reservoir 50.

As can best be illustrated in FIG. 7, operation of the system 10 according to the preferred embodiment of the present invention will be described. Using adjustment screws J, shield 57 is positioned against sleeve 24, and spans the length of sleeve 24 such that sleeve 24 rides up against shield 57 as sleeve 24 rotates in the direction shown by reference letter Shield 57 may also be spaced from sleeve 24 by a small distance. Shield 57 also includes a portion 57a which rides against an underside surface of the manifold 44. Liquid sizing L flowing from manifold 44, then, pools in a crevice formed by sleeve 24, shield 57 and manifold 44.

Sleeve 24 is rotated about shaft 22, by drive device M, at a predetermined rate, for example, 1½ revolutions per second, in the rotational direction. As sleeve 24 passes through pool of sizing L, a thin film of sizing L covers sleeve 24 and is transported to a location where fibers F kiss the sleeve 24 (FIG. 4), thereby each picking up, and being coated with, a small quantity of sizing L. Excess sizing L not transferred to fibers F of fan N remains on sleeve 24, is scraped from sleeve 24 by shield 57 and is fluidly diverted into reservoir 50, where the sizing L is re-circulated to the manifold 44 using conventional pumping or metering equipment.

Referring now to FIG. 8, it can be seen that points A=, B= and C=, each of which resides on the periphery of sleeve 24, rotate in planes which are oblique to one another, but which converge to the radial center 66 of the curved center portion 22a of shaft 22, that being, near shoe 60. As stated above, radial center 66 of curved center portion 22a of shaft 22 is generally coincident with a gathering point of fibers F in fan N. Because fiber fan N converges towards shoe 60, and more particularly, towards radial center 66 of arcuate shaft 22, fibers $F_1$, $F_2$, $F_3$ of fan N typically kiss sleeve 24 at a velocity $v_1$, $v_2$, $v_3$, respectively, of about 2,000–5,000 feet per minute, which are each directed towards the radial center 66 of shoe 60. Fiber velocities, such as fiber velocities $v_1$, $v_2$, $v_3$, and sleeve point velocities, such as velocities $v_A$, $v_B$, $v_C$, are substantially coaxial to one another, respectively, at all points on sleeve 24. Accordingly, fibers $F_1$, $F_2$, $F_3$ each experience substantially the same tensile stress and are each substantially relieved of fiber-walking influences.

Alternatively, the shaft 22 may be formed of a flexible, fatigue-resistant elastomer material and rotatably mounted at one end thereof to the bracket 13 of the upright frame 12, for example, by a ball bearing (not shown), in which case, sleeve 24 is not provided thereover. The shaft 22, then, would be fixedly mounted to the drive shaft D, such as, by a pin, key or clamp (not shown), such that, rotation of the drive shaft D, such as, by drive device DR, rotates shaft 22 about the central axis $C_R$.

Although the present invention has been described in terms of specific embodiments which are set forth in detail, it should be understood that this is by illustration only and that the present invention is not limited thereto, since alternative embodiments not described in detail herein will become apparent to those skilled in the art in view of the above description, the attached drawings and the appended claims. Accordingly, modifications are contemplated which can be made without departing from the spirit or the scope of the present invention.

We claim:

1. A sizing application system for applying a sizing composition to a fan of one or more fibers, comprising:
    a roll comprising a shaft having a curved central axis, and a sleeve covering at least a portion of said shaft, said sleeve being rotatable relative to said shaft, wherein each fiber of said fan of one or more fibers contacts said sleeve at an axial location of said sleeve, and wherein each fiber of said fan of one or more fibers lies substantially in a plane perpendicular to said curved central axis of said shaft at said axial location; and
    a sizing delivery assembly for providing sizing composition to a surface of said sleeve, said sizing composition being transferred to each of said fibers of said fan of one or more fibers when said fibers contact said sleeve.

2. The system of claim 1, wherein said shaft is fixed at one end thereof, and wherein said sleeve is adapted to be connected to a drive device to rotate said sleeve relative to said shaft.

3. The system of claim 1, wherein said sleeve is constructed from an elastomer material.

4. The system of claim 3, wherein said sleeve is constructed from one material selected from the group comprising neoprene, natural rubber, silicone rubber and synthetic rubber.

5. The system of claim 1, wherein said curved central axis includes an arcuate portion thereof, said arcuate portion having a radius defining a focal point spaced from said curved central axis, wherein each fiber of said fan of one or more fibers moves over said roll in a direction substantially towards said focal point.

6. The system of claim 1, wherein said sleeve rotates about said curved central axis of said shaft.

7. The system of claim 1, wherein said shaft includes an arcuate center portion, a first linear end portion extending from a first end of said arcuate center portion and a second linear end portion extending from a second end of said arcuate center portion.

8. The system of claim 7, wherein said sleeve covers all of said arcuate center portion of said shaft, and wherein said sleeve covers at least a portion of each of said first and second end portions of said shaft.

9. The system of claim 1, further comprising at least one bushing interposed between of said sleeve and said shaft, wherein said bushing is in sliding rotational relationship with said shaft, and wherein said bushing is affixed to said sleeve such that said bushing rotates with said sleeve around said shaft.

10. The system of claim 9, wherein a first end of said bushing is affixed to said sleeve, and wherein a second end of said bushing is affixed to a drive device for effecting rotation of said sleeve about said shaft.

* * * * *